(12) United States Patent
Lin

(10) Patent No.: US 7,228,052 B1
(45) Date of Patent: Jun. 5, 2007

(54) LED LIGHT PIPE STRUCTURE

(75) Inventor: Wei-Cheng Lin, Tucheng (TW)

(73) Assignee: Lumina Technology Co., Ltd., Taipei (TW)

( * ) Notice: Subject to any disclaimer, the term of this patent is extended or adjusted under 35 U.S.C. 154(b) by 0 days.

(21) Appl. No.: 11/432,613

(22) Filed: May 12, 2006

(51) Int. Cl.
*G02B 6/10* (2006.01)

(52) U.S. Cl. .................. 385/146; 385/901; 362/326; 362/555

(58) Field of Classification Search ............. 385/146, 385/901; 362/326, 555
See application file for complete search history.

(56) References Cited

U.S. PATENT DOCUMENTS

| | | | | |
|---|---|---|---|---|
| 5,810,463 | A * | 9/1998 | Kawahara et al. | 362/601 |
| 6,910,783 | B2 * | 6/2005 | Mezei et al. | 362/615 |
| 2004/0240232 | A1 * | 12/2004 | Choi et al. | 362/583 |
| 2005/0073229 | A1 * | 4/2005 | Wimbert et al. | 313/111 |
| 2005/0259939 | A1 * | 11/2005 | Rinko | 385/146 |

FOREIGN PATENT DOCUMENTS

JP          2001250410 A  *  9/2001

* cited by examiner

*Primary Examiner*—Sung Pak
*Assistant Examiner*—Daniel Petkovsek
(74) *Attorney, Agent, or Firm*—Troxell Law Office, PLLC

(57) ABSTRACT

An LED light pipe structure includes a light pipe, a light refraction plate, and a light emitting diode which are integrally formed into one body, so as to enable the light emitting diode inside the light pipe to generate a visible light for illumination, through a voltage of direct-current power source provided by a lamp holder.

The visible light for illumination generated by the light emitting diode can be refracted and transmitted in an effective range by the light refraction plate, such that the light pipe can generate an illumination of good brightness and quality. In addition, when the light pipe is emplaced in environment of different illumination, the light emitting diode can be replaced with a light emitter of different light source, through that the light pipe can be fixed separately, such that the light pipe can be provided with functions of illuminating and identifying colors.

3 Claims, 10 Drawing Sheets

LED LIGHT PIPE STRUCTURE

BACKGROUND OF THE INVENTION (a) Field of the Invention

The present invention relates to an LED (Light Emitting Diode) light pipe structure, and more particularly to an LED light pipe structure wherein a voltage of direct-current power source is provided by a lamp holder to enable the light emitting diode to generate a visible light for illumination which can also be refracted and transmitted in an effective range, such that the light pipe can generate an illumination of good brightness and quality.

(b) Description of the Prior Art

Referring to FIG. 1 and FIG. 2, an illuminant tube A commonly used in the existing market includes an incandescent bulb A1 and a fluorescent tube A2, respectively. When the incandescent bulb A1 or the fluorescent tube A2 is connected to a connection end A5 of a lamp holder A4, by a conductive contact end A3 extended at a tail end, heat will be generated from a high temperature to form a light emitting status of the illuminant tube A, through a filament chip A6 at an interior of the illuminant tube A. However, the light emitting status generated from the illuminant tube A will induce a consumption of a lot of energy under a long term of usage, and the high temperature generated from the filament chip A6 for a long time is easy to cause a light source to be dimmed, along with a safety concern during a long period of heating from high temperature.

Accordingly, how to remove the aforementioned shortcomings is a technical issue to be solved by the present inventor.

SUMMARY OF THE INVENTION

The primary object of the present invention is to provide an LED (Light Emitting Diode) light pipe structure which uses a lamp holder to provide a voltage of direct-current power source, enabling the light emitting diode to generate a visible light for illumination which can also be refracted and transmitted in an effective range, such that the light pipe can generate an illumination of good brightness and quality.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
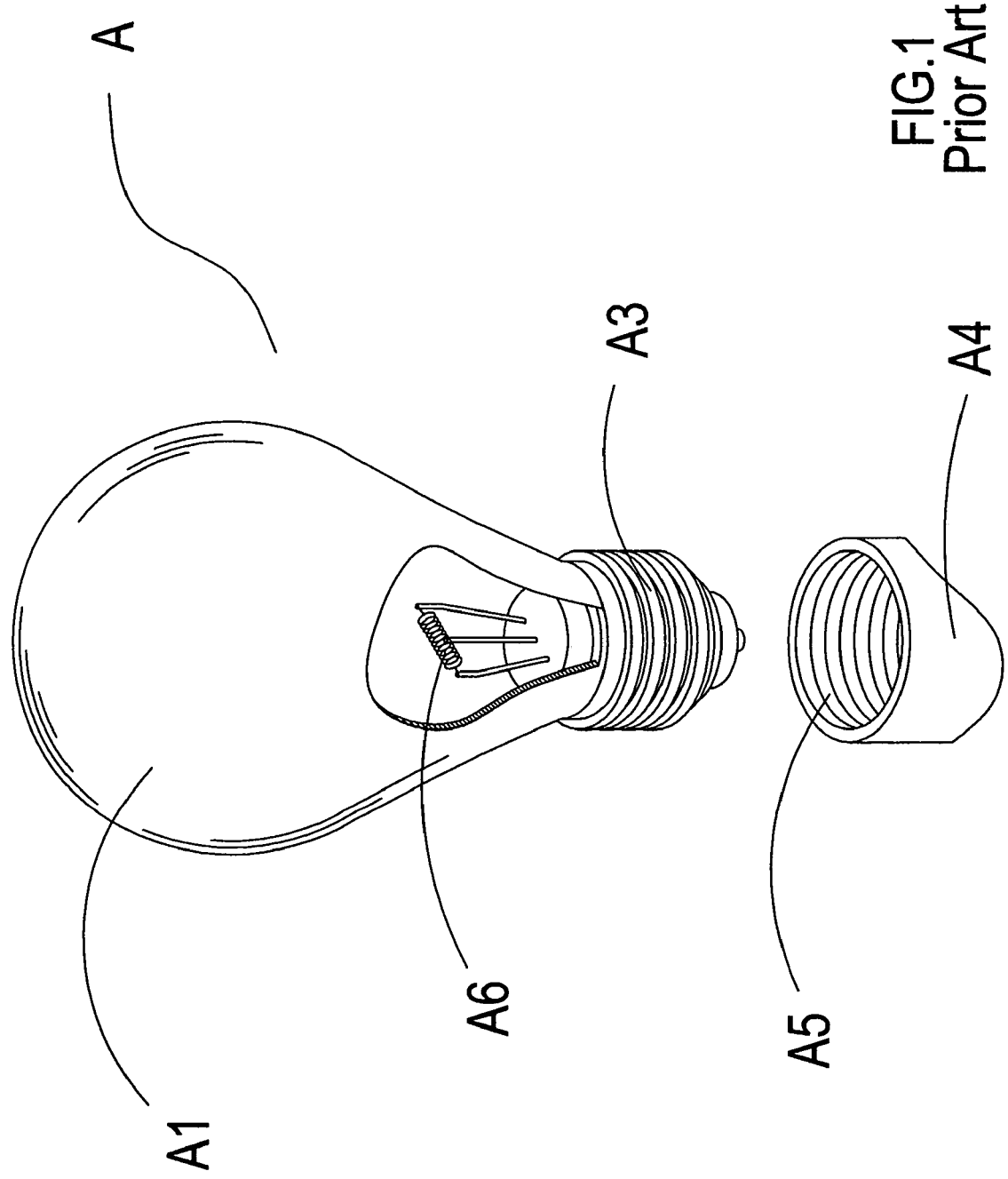
FIG. 1 shows a cutaway view of a conventional application.
Figure 2:
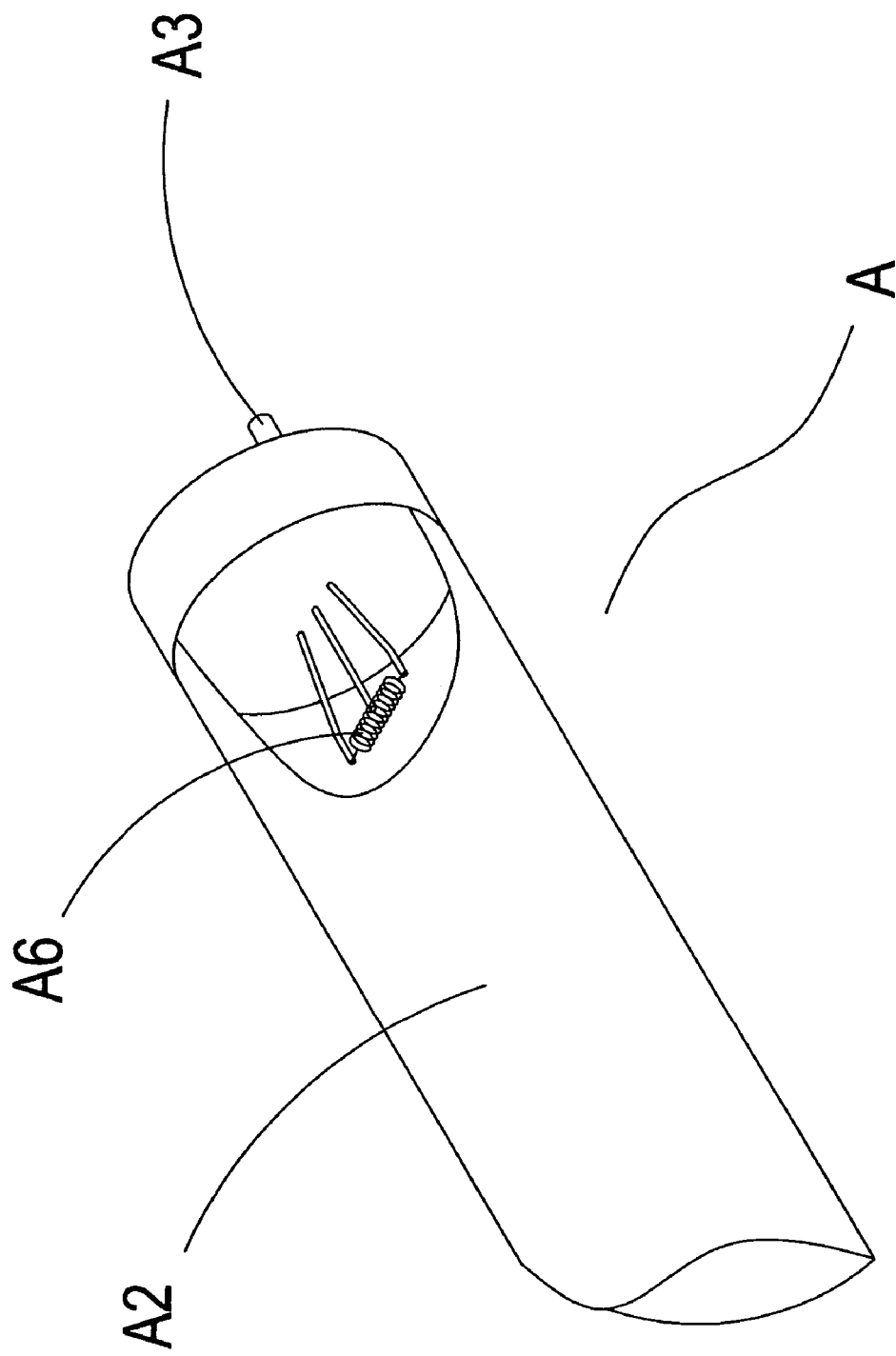
FIG. 2 shows a cutaway view of another conventional application.
Figure 3:
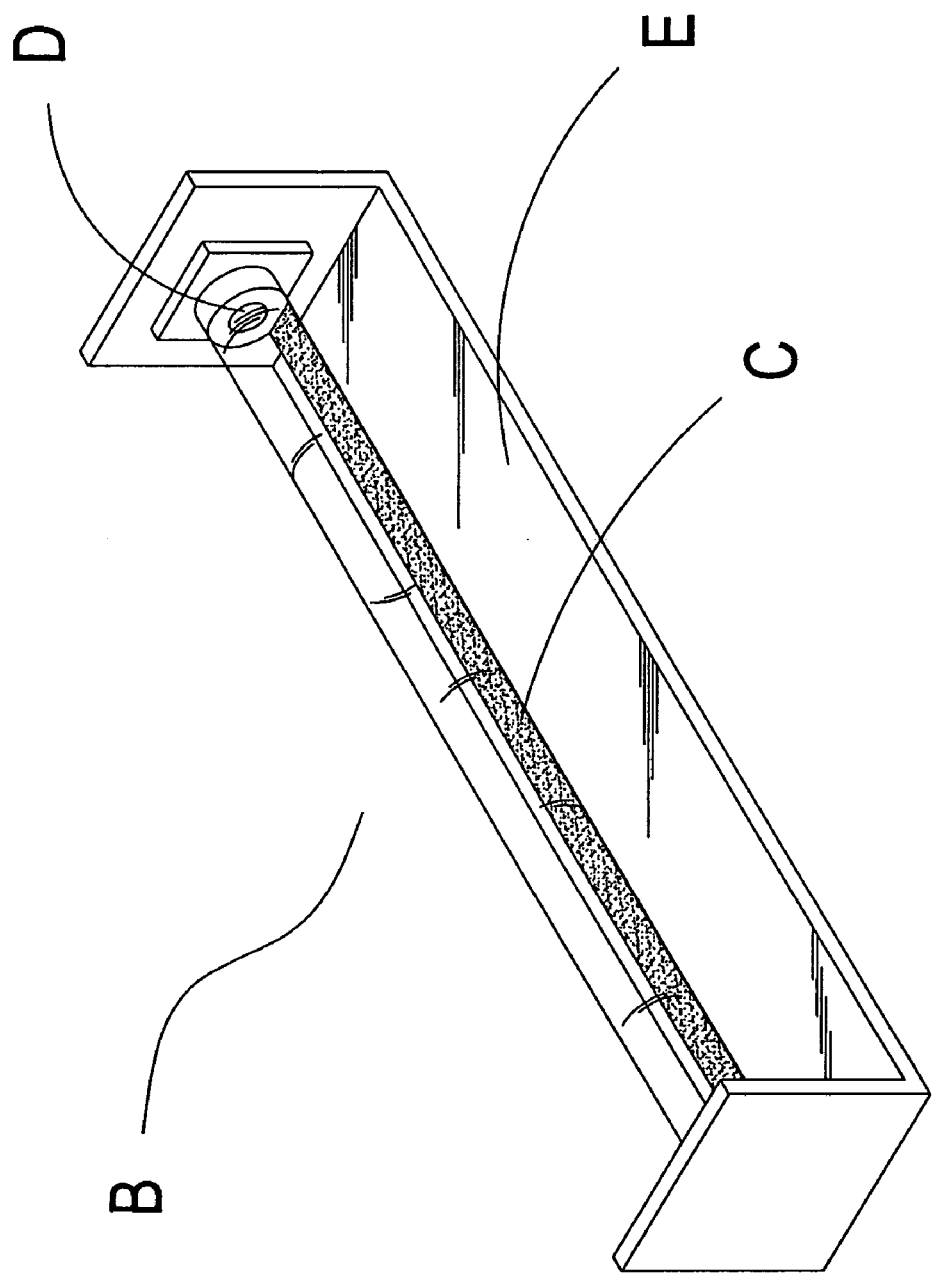
FIG. 3 shows a perspective view of the present invention.
Figure 4:
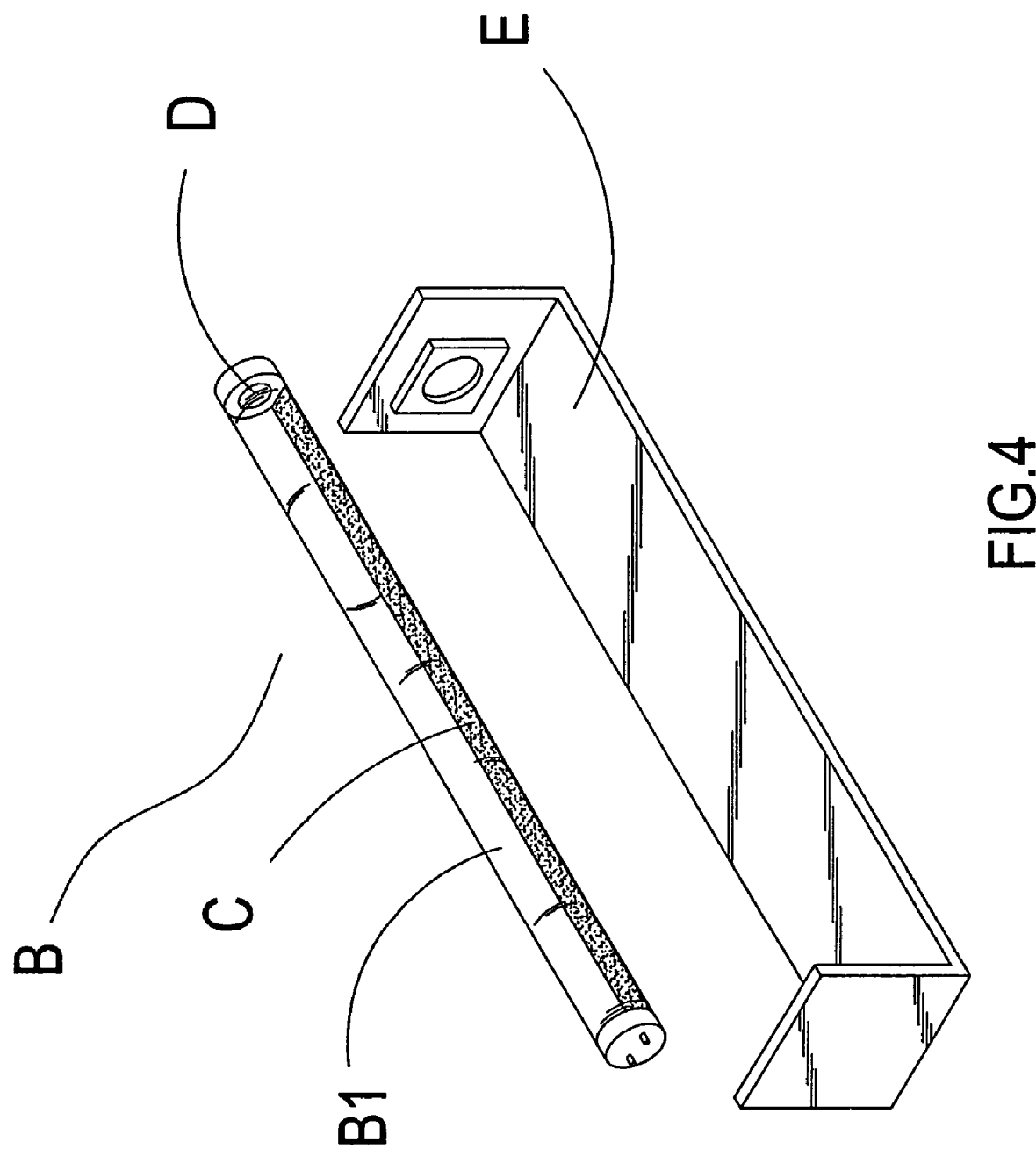
FIG. 4 shows an exploded view of the present invention.

Referring to FIG. 3 and FIG. 4, the present invention comprises primarily a light pipe B, a light refraction plate C, a light emitting diode D, and a lamp holder E. The light pipe B is a cylindrical body B1 which is provided with a good guiding property and transmitting property, the light emitting diode D capable of generating a visible light for illumination is located at a tail end of the cylindrical body B1, and is corresponding to the light refraction plate C of light pipe B.

The light refraction plate C and the light pipe B are installed as one body with an electroplating, an affixing, or a coating method. When the light emitting diode D projects a visible light for illumination, the light refraction plate C can proceed with refracting and transmitting in an effective range.

In addition, a plurality of light emitting diodes D can be aligned and fixed at the tail end of the light pipe B. When the light pipe B is used for emitting light of different brightness, an application of different brightness can be achieved, through an installation of various quantities of different light emitting diodes D at the tail end.

Figure 5:
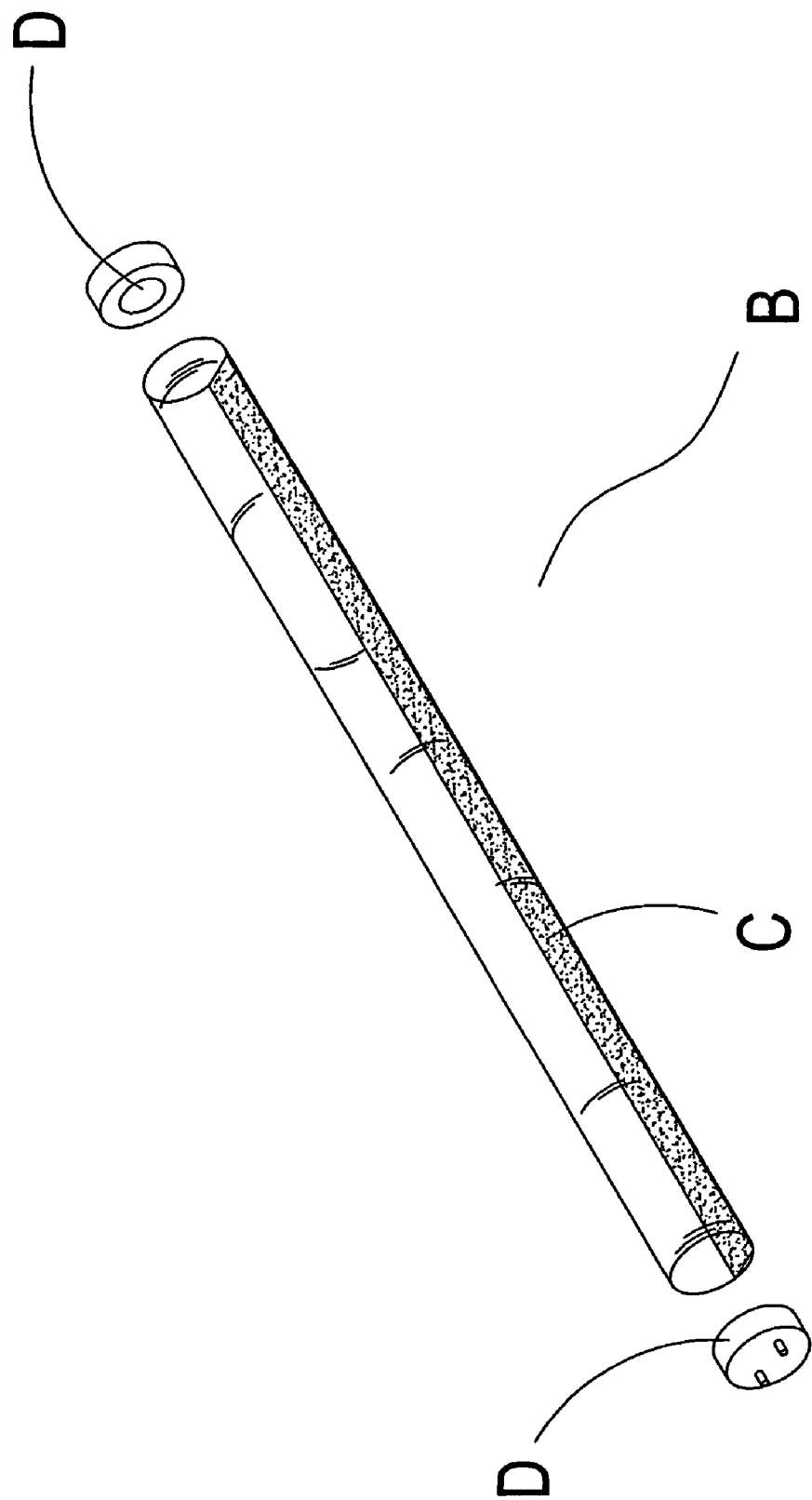
FIG. 5 shows a schematic view of the present invention.

Referring to FIG. 4 and FIG. 5, the light pipe B, the light refraction plate C, and the light emitting diode D are integrally formed into one body, such that when the light pipe B is connected to the lamp holder E, the light emitting diode D can generate the visible light for illumination, with the voltage of direct-current power source provided by the lamp holder.

The light refraction plate C can proceed with the refracting and transmitting in the effective range to the visible light for illumination generated by the light emitting diode D, to enable the light pipe B to generate the illumination of good brightness. In addition, when the light pipe B is emplaced in environment of different illumination, the light emitting diode D can be replaced with a light emitter of different light source, through that the light pipe B can be fixed separately, such that the light pipe B can be provided with functions of illuminating and identifying colors.

Figure 6:
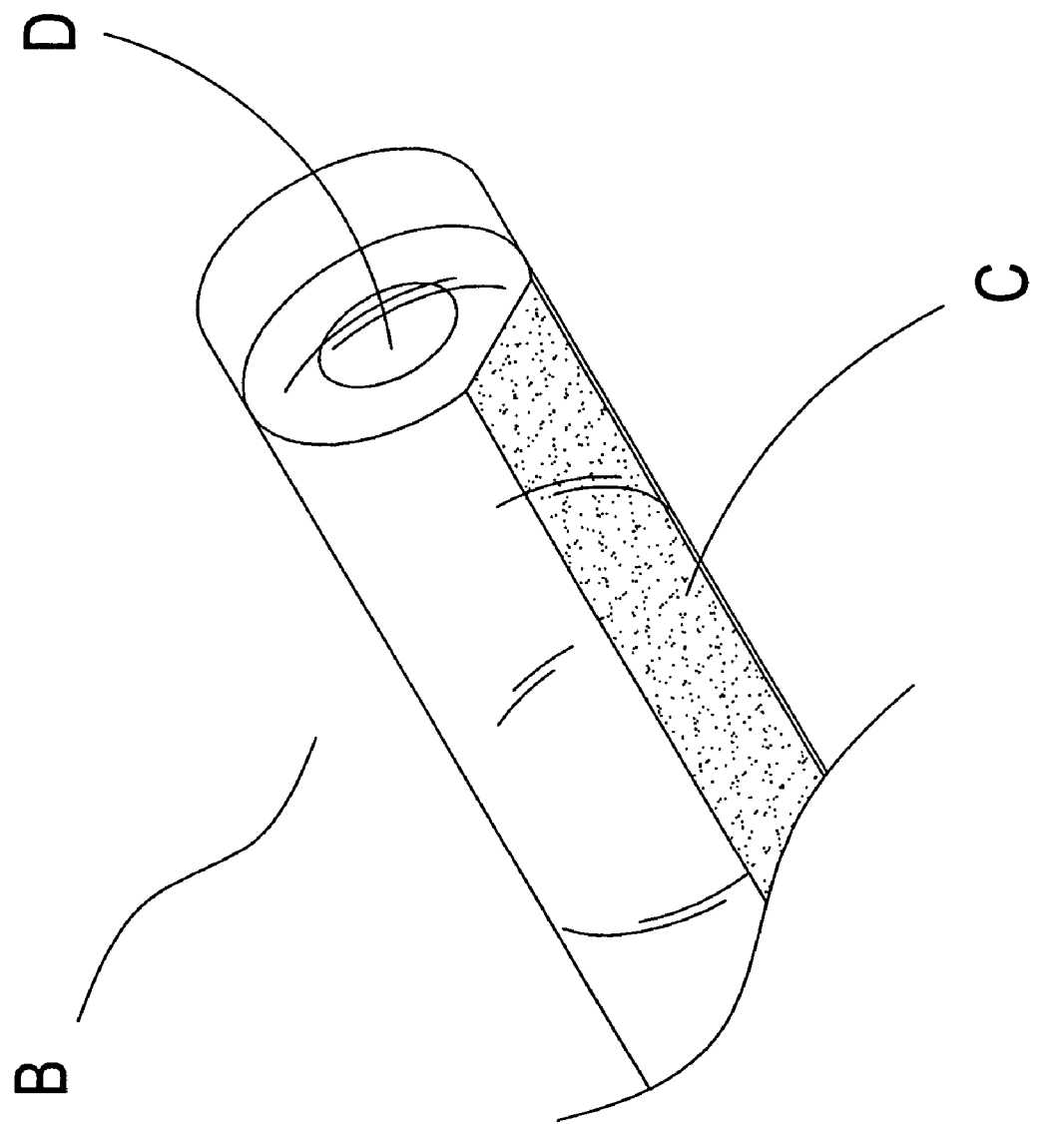
FIG. 6 shows a cutaway view of the present invention.
Figure 7:
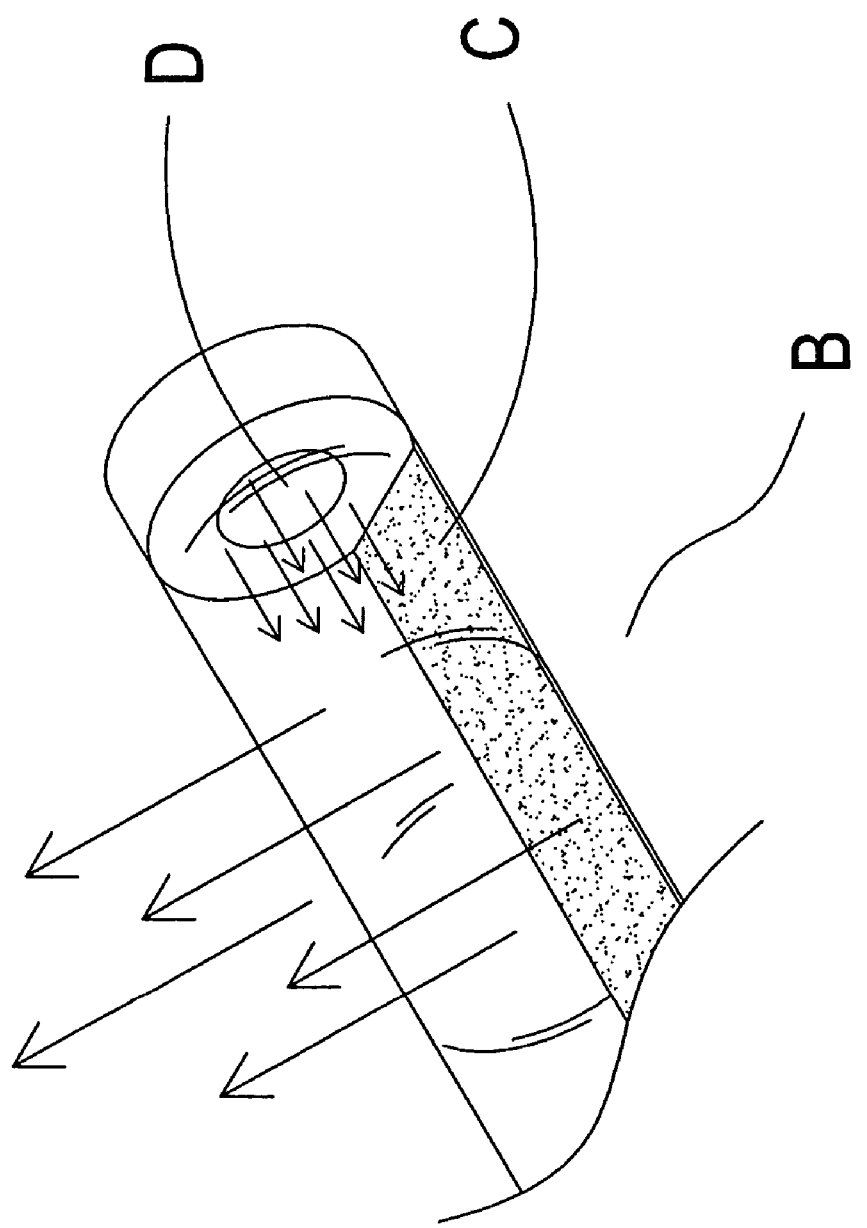
FIG. 7 shows a schematic view of an embodiment of the present invention.
Figure 8:
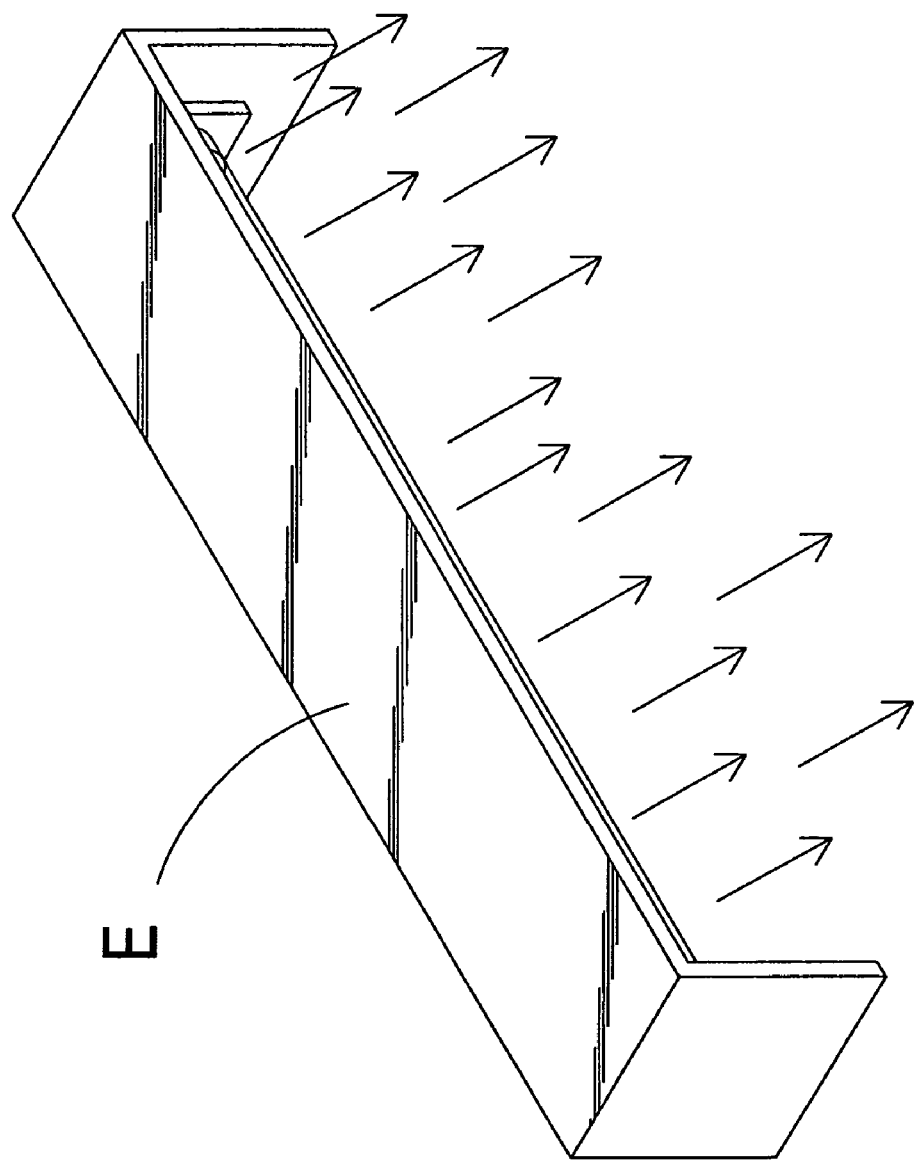
FIG. 8 shows a second schematic view of an embodiment of the present invention.

Referring to FIGS. 6 to 8, when the light pipe B is used on the lamp holder E, the light emitting diode D of light pipe B will generate the good visible light for illumination, with the voltage of direct-current power source provided by the lamp holder E. When the visible light for illumination is projected on the light pipe B, a good light guiding and refracting can be available through the light pipe B and the light refraction plate C, so as to enable the light pipe B to achieve an illumination of good brightness and quality.

The light refraction plate C of light pipe B can achieve a light refraction effect of various widths, through an electroplating, an affixing, or a coating method. When the light emitting diode D installed in the light pipe B is generating the visible light for illumination, the light pipe B can generate the brightness in different range of illumination.

When the light emitting diode D is generating the visible light for illumination, the light pipe B can generate the illumination in different brightness, which can be further used for illumination in different purposes in accordance with a user, through installing various quantities of light emitting diodes D on the light pipe B.

Figure 9:
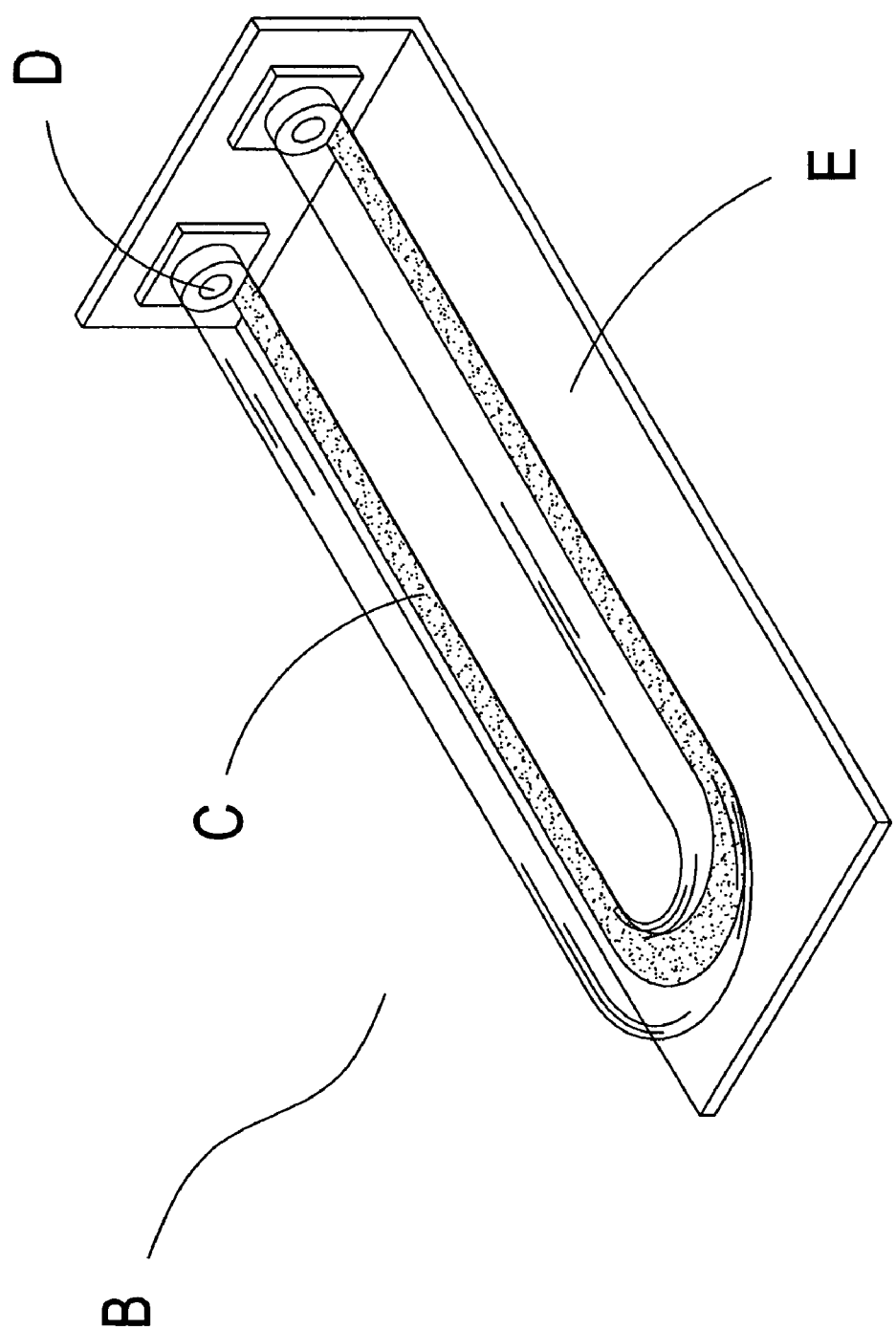
FIG. 9 shows a schematic view of a further embodiment of the present invention.
Figure 10:
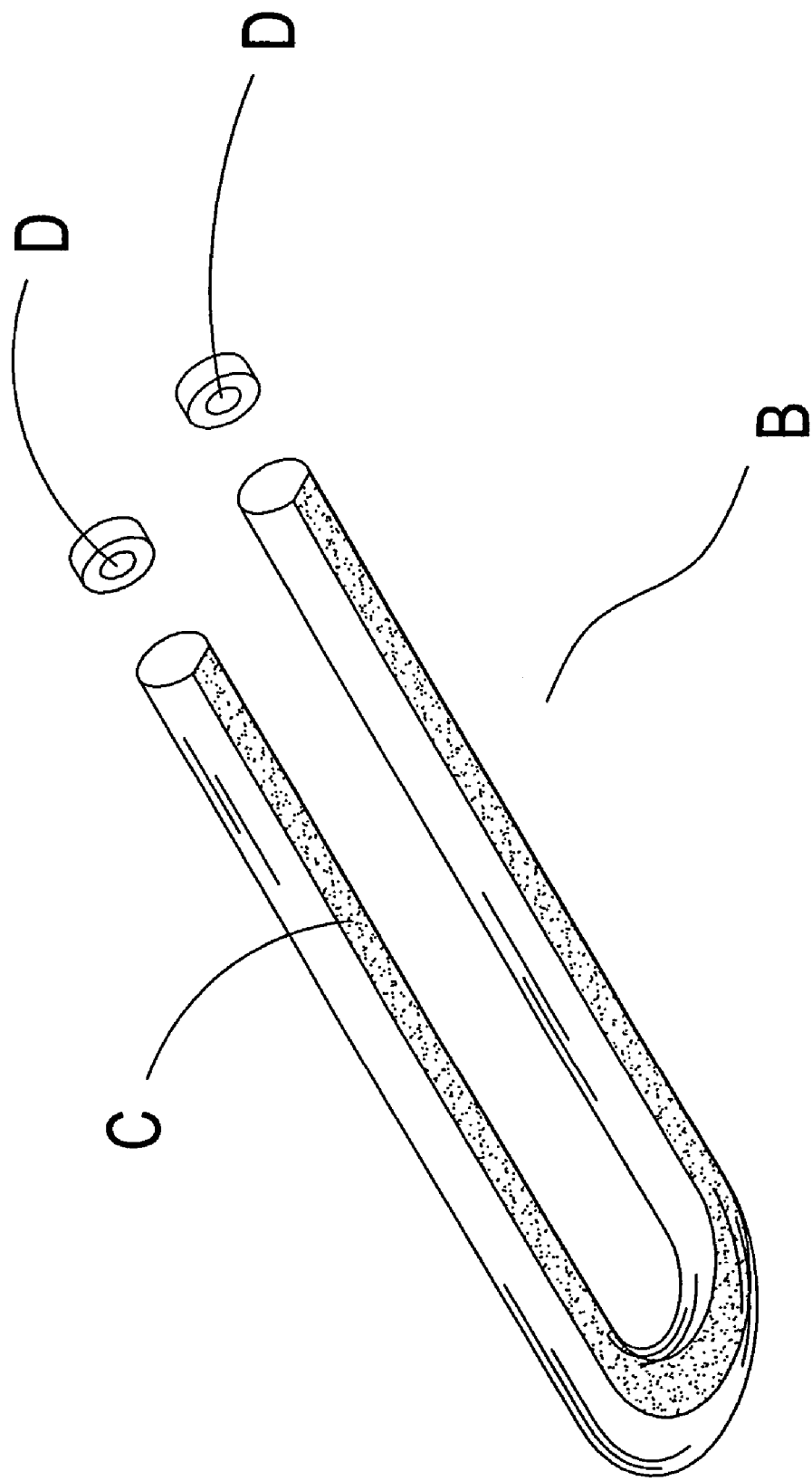
FIG. 10 shows a second schematic view of a further embodiment of the present invention.

Referring to FIG. 9 and FIG. 10, the light pipe B, the light refraction plate C, and the light emitting diode D are integrally formed. When the light pipe B is used along with a different lamp holder E, it can be further a loop-shape pipe, a circular pipe, a straight-column-shape pipe, a curve-shape pipe, an arc-shape pipe, and other related pipe in a shape of different variation, such that the light pipe B can perform different illuminations and be used for different visual changes, in accordance with different situations.

When the light pipe B is emplaced in different illumination environment, the light emitting diode D can be replaced with a light emitter of different light source, through that the light pipe B can be fixed separately, such that the light pipe B can achieve different illumination and can identify different colors, by the visible light of different light source for illumination.

To further manifest the advancement and practicability of the present invention, the present invention is compared with a conventional application as below:

Shortcomings of a Conventional Application
1. The status of light emitting from high temperature of the illuminant tube will induce a consumption of a lot of energy under a long term of usage.
2. The status of light emitting from high temperature will easily cause the illumination source to be dimmed.
3. It is easy to raise a safety concern of usage for a long term of heating from high temperature.

Advantages of the Present Invention
1. The light emitting diodes in various quantities can generate an illumination of good quality.
2. The lamp holder provides the voltage of direct-current power source, which can effectively save the consumption of power source.
3. The status of light emitting from the light emitting diode is not easy to cause a blinking of illumination.
4. The light emitting diodes in various quantities can generate the illumination effect of different brightness.
5. The light pipe is provided with a good guiding property, which will not be limited by the shape of pipe.
6. The light emitting diode can be replaced with that of different light source, through that the light pipe can be fixed separately.
7. It is provided with advancement and practicability.
8. It is can improve an industrial competitiveness.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An LED light pipe structure, comprising:
   an elongated light pipe having a cylindrical body;
   a light refraction plate affixed to the cylindrical body and extending parallel to the length of the elongated light pipe; and
   a replaceable light emitting diode mounted at an end of the elongated light pipe; and
   a lamp holder configured to both support the elongated light pipe and power the light emitting diode,
   wherein the elongated light pipe, light refraction plate, and light emitting diode are integrally formed into one body,
   wherein the light refraction plate is located in a position to refract and transmit light generated by the light emitting diode.

2. The LED light pipe structure according to claim 1, wherein the light emitting diode is selected from the group consisting of a white-light emitter, a cold-light emitter, a red-light emitter, and a yellow-light emitter.

3. The LED light pipe structure according to claim 1, wherein the light pipe is selected from the group consisting of a loop-shape pipe, a circular pipe, a straight-column-shape pipe, a curve-shape pipe, and an arc-shape pipe.

* * * * *